(12) United States Patent
Matsushita et al.

(10) Patent No.: US 9,138,649 B2
(45) Date of Patent: Sep. 22, 2015

(54) GAME CONTROL PROGRAM, GAME DEVICE, AND GAME CONTROL METHOD ADAPTED TO CONTROL GAME WHERE OBJECTS ARE MOVED IN GAME FIELD

(75) Inventors: Hirokazu Matsushita, Tokyo (JP); Taro Matsuda, Tokyo (JP); Hidehito Kojima, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 408 days.

(21) Appl. No.: 13/122,990

(22) PCT Filed: Jun. 30, 2009

(86) PCT No.: PCT/JP2009/003041
§ 371 (c)(1),
(2), (4) Date: Jun. 20, 2011

(87) PCT Pub. No.: WO2010/041358
PCT Pub. Date: Apr. 15, 2010

(65) Prior Publication Data
US 2011/0319164 A1    Dec. 29, 2011

(30) Foreign Application Priority Data

Oct. 8, 2008  (JP) .................................. 2008-262292
Oct. 8, 2008  (JP) .................................. 2008-262293

(51) Int. Cl.
*A63F 13/57*     (2014.01)
*A63F 13/55*     (2014.01)
(Continued)

(52) U.S. Cl.
CPC ................. *A63F 13/57* (2013.01); *A63F 13/55* (2013.01); *G06T 13/20* (2013.01); *G06T 13/60* (2013.01); *A63F 13/10* (2013.01); *A63F 2300/64* (2013.01);
(Continued)

(58) Field of Classification Search
USPC ........................................................ 463/32
See application file for complete search history.

(56) References Cited

U.S. PATENT DOCUMENTS 5,577,185 A * 11/1996 Tunnell et al. ................ 345/473
6,377,865 B1 * 4/2002 Edelsbrunner et al. ......... 700/98
(Continued)

FOREIGN PATENT DOCUMENTS

JP  2002066132  3/2002
JP  2003091740  3/2003
(Continued)

OTHER PUBLICATIONS

International Search Report dated Sep. 29, 2009 from the corresponding PCT/JP2009/003041, with English translation.
(Continued)

*Primary Examiner* — Bach Hoang
*Assistant Examiner* — Anh Vo V Nguyen
(74) *Attorney, Agent, or Firm* — Katten Muchin Rosenman LLP

(57) ABSTRACT

In a game device, a game control unit arranges an object in a three-dimensional space provided in a game field. A temperature-distribution simulator simulates a physical phenomenon on a two-dimensional plane, onto which a three-dimensional space is projected, in reference to a distribution-data storage unit. The game control unit applies the simulated physical phenomenon on an object in the three-dimensional space. A mycelial-growth simulator similarly simulates a physical phenomenon on a two-dimensional plane.

4 Claims, 10 Drawing Sheets

(51) Int. Cl.
*G06T 13/60* (2011.01)
*G06T 13/20* (2011.01)
*A63F 13/40* (2014.01)

(52) U.S. Cl.
CPC ..... *A63F 2300/66* (2013.01); *A63F 2300/8064* (2013.01)

(56) References Cited

U.S. PATENT DOCUMENTS

| | | | |
|---|---|---|---|
| 6,519,553 | B1* | 2/2003 | Barnette et al. ............... 703/2 |
| 7,050,612 | B2* | 5/2006 | Hale ............... 382/128 |
| 7,239,990 | B2* | 7/2007 | Struijs ............... 703/2 |
| 7,650,266 | B2* | 1/2010 | Muller-Fischer et al. ........ 703/6 |
| 7,724,258 | B2* | 5/2010 | Ebert et al. ............... 345/473 |
| 8,112,254 | B1* | 2/2012 | Bhat et al. |
| 8,128,476 | B1* | 3/2012 | Sidhu et al. ............... 463/16 |
| 8,289,327 | B1* | 10/2012 | Horvath ............... 345/428 |
| 8,666,712 | B2* | 3/2014 | Bleiweiss et al. ............... 703/6 |
| 2002/0075244 | A1* | 6/2002 | Tani et al. ............... 345/173 |
| 2003/0231182 | A1* | 12/2003 | Park et al. ............... 345/474 |
| 2004/0002380 | A1* | 1/2004 | Brosnan et al. ............... 463/32 |
| 2004/0179043 | A1* | 9/2004 | Viellescaze et al. ......... 345/861 |
| 2005/0277456 | A1* | 12/2005 | Mizuguchi et al. ............... 463/7 |
| 2006/0001673 | A1* | 1/2006 | Brand ............... 345/582 |
| 2006/0074610 | A1* | 4/2006 | Rasmussen et al. ............... 703/2 |
| 2006/0258415 | A1* | 11/2006 | Nakano et al. ............... 463/1 |
| 2007/0002056 | A1* | 1/2007 | Chen et al. ............... 345/473 |
| 2007/0146363 | A1* | 6/2007 | Shen ............... 345/420 |
| 2007/0265045 | A1* | 11/2007 | Takai ............... 463/8 |
| 2007/0265089 | A1* | 11/2007 | Robarts et al. ............... 463/42 |
| 2009/0036196 | A1* | 2/2009 | Ansari et al. ............... 463/20 |
| 2009/0079734 | A1* | 3/2009 | McDaniel ............... 345/419 |
| 2010/0029377 | A1* | 2/2010 | Canterbury et al. ........... 463/25 |
| 2010/0029384 | A1* | 2/2010 | Andersen et al. ............... 463/32 |

FOREIGN PATENT DOCUMENTS

| | | |
|---|---|---|
| JP | 2003-260269 | 9/2003 |
| JP | 2004180969 | 7/2004 |
| JP | 2004220273 | 8/2004 |
| JP | 2005-7069 | 1/2005 |
| JP | 2008-212416 | 9/2008 |
| JP | 2008-212417 | 9/2008 |

OTHER PUBLICATIONS

International Preliminary Report on Patentability dated May 17, 2011 from the corresponding PCT/JP2009/003041, with English translation.
Kota Azuma, "Sensei to Seito no Tameno BASIC Programming Koza", Mycom Basic Magazine, Jul. 1, 1998, vol. 17, pp. 96 to 99. Please see International Search Report and International Preliminary Report for relevance and English-language abstract.
Takafumi Watanabe et al., "Shototsu o Tomonau Kaso Dansei Buttai no Real-time Animation Model no Teian", IEICE Technical Report, Sep. 30, 2003, vol. 103, No. 352, pp. 35 to 40, with English-abstract.
Notification of Reason(s) for Refusal dated Aug. 9, 2011, from corresponding Japanese Application No. 2008-262293.
Notification of Reason(s) for Refusal, dated Jan. 10, 2012, from corresponding Japanese Application No. 2008-262292.
Kenichiro Matsuura, et. al., "Action game algorithm maniax", Japan, SOFTBANK Creative Corp., May 30, 2007, first edition, pp. 83-94, 420.
Decision of Refusal dated Oct. 30, 2012, from corresponding Japanese Application No. 2008-262292.

* cited by examiner

FIG. 3

| OBJECT ID | POSITION | DIRECTION | SHAPE | STATUS |
|---|---|---|---|---|
| 0001 | (20, 5, 0) | (0, 6, 0) | 3 | NORMAL |
| 0002 | (61, 0, 0) | (6, 2, 0) | 1 | BURNING |
| 0003 | (43, 12, 26) | (25, 42, 8) | 2 | NORMAL |
| : | : | : | : | : |

GAME CONTROL PROGRAM, GAME DEVICE, AND GAME CONTROL METHOD ADAPTED TO CONTROL GAME WHERE OBJECTS ARE MOVED IN GAME FIELD

TECHNICAL FIELD

The present invention relates to game control technology and, more particularly, to game control programs, game devices, and game control methods adapted to control a game where objects are moved in a game field.

BACKGROUND ART

So-called "falling-block puzzle" games have been popular where a plurality of objects are dropped in a game field and arranged such that a predetermined condition is satisfied so as to delete the objects.

DISCLOSURE OF INVENTION

Problem to be Solved by the Invention

Various types of falling-block puzzle games with ingenious shapes and arrangement of objects have been provided; however, there is a strong need for games, which are kind of like falling-block puzzle games, that are innovative and have high entertainment value.

In this background, a general purpose of the present invention is to provide game control techniques with high entertainment value.

Means for Solving the Problem

Literal translation of international application a game control program. The game control program comprises computer-implemented modules of: arranging an object in a three-dimensional space provided in a game field; simulating a physical phenomenon on a two-dimensional plane onto which the three-dimensional space is projected; and applying the simulated physical phenomenon on the object in the three-dimensional space.

Another embodiment of the present invention relates to a game control program. The game control program comprises computer-implemented modules of: retrieving both a physical quantity of an object arranged in a game field and a force acting on the object and calculating the movement of the object by a physical calculation; and adjusting the physical quantity of the object or the force acting of the object so that a motion of the object is different from a real-world motion.

Optional combinations of the aforementioned constituting elements, and implementations of the invention in the form of methods, apparatuses, and systems may also be practiced as additional modes of the present invention.

Advantageous Effects

The present invention can provide a game control technique with high entertainment value.

BRIEF DESCRIPTION OF THE DRAWINGS

FIG. 3 is a diagram showing an example of internal data in an object database;

BEST MODE FOR CARRYING OUT THE INVENTION

A game device according to the embodiment provides a game in which objects are moved so that they collide with one another in a game field. In this game, a displacement of an object, an alteration caused due to a collision, and the like are all calculated by a physical calculation after setting a physical quantity of the object and a force acting on the object.

A game according to the embodiment is similar to a so-called "falling-block puzzle" game, where objects are dropped such that they are accumulated on one another in a game field. However, the game is different from a conventional falling-block puzzle game from various aspects. As described previously, all displacements of an object are calculated by a physical calculation. Thus, the object is controlled by laws of physics during a time period including a time when the object is being dropped and a time when the object is being accumulated after the fall. A player can adjust the drop position of the object by moving the object from side to side during a time when the object is falling in the game field. However, if the object is let to fall freely based on the physical calculation, the falling velocity will be too high for the player to perform an operation on the object. Therefore, in order to adjust the falling velocity of the object, virtual buoyancy is set for the object so as to adjust the velocity such that the player can perform an operation on the object in the present embodiment.

In a typical falling-block puzzle, a plurality of objects of the same type are deleted when they are arranged one above the other or one next to the other. In a game according to the present embodiment, an object is divided or squashed by moving the object to collide with another object so that the volume of the object is reduced. An item, which is used for burning or decomposing the object, is also prepared, and the object is deleted from the game field by using such an item.

In the present embodiment, a three-dimensional object is deposited in the game field; thus, the arrangement of the object is determined by a physical calculation. However, when simulating temperature distribution within the game field to control the burning of the object, the temperature distribution in the depth direction is disregarded, and the temperature distribution is calculated within a two-dimensional plane. This allows the computational load to be reduced while minimizing any effect on the game. Since the physical phenomenon is simplified for the simulation, the player can have easier understanding on the physical phenomenon.

Figure 1:
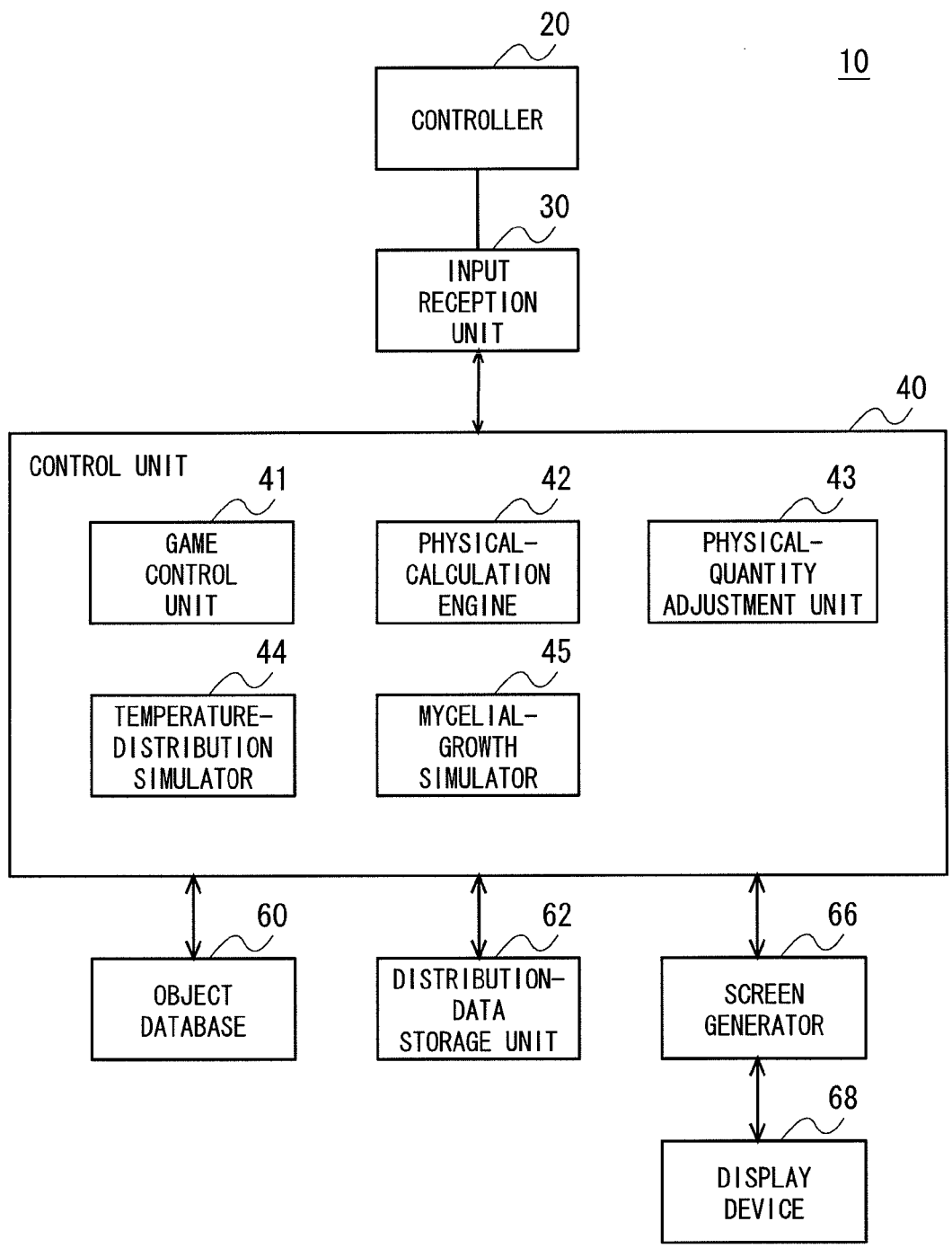
FIG. 1 is a diagram showing the configuration of a game device according to the embodiment.

FIG. 1 shows the configuration of a game device 10 according to the embodiment. The game device 10 is provided with a controller 20, an input reception unit 30, a control unit 40, an object database 60, a distribution-data storage unit 62, a screen generator 66, and a display device 68. These configurations are implemented in hardware component by any CPU of a computer, a memory or a program loaded into the memory. Functional blocks are implemented by the cooperation of hardware components. Thus, a person skilled in the art should appreciate that there are many ways of accomplishing these functional blocks in various forms in accordance with the components of hardware only, software only, or the combination of both.

The input reception unit 30 receives a control signal input from the controller 20 operated by a player. Based on an operating input from the player received by the input reception unit 30, the control unit 40 controls the behavior of the object in the game field and allows the game to progress accordingly. The screen generator 66 generates a game screen controlled by the control unit 40 and displays the screen on the display device 68.

Figure 2:
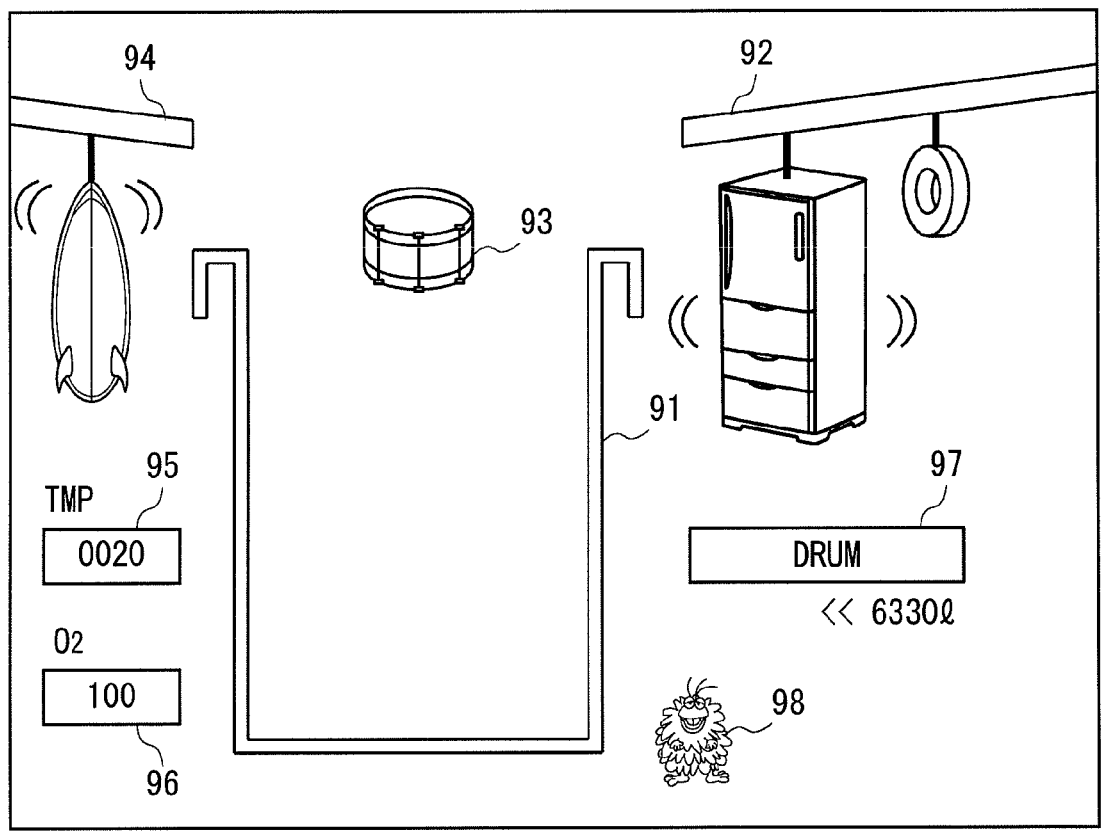
FIG. 2 is a diagram showing an example of a screen to be displayed in a display device.

FIG. 2 shows an example of a screen to be displayed on a display device. A game field 91 having a shape of a trash can is provided near the center of the screen, and an object 93 is accumulated inside the game field 91. A belt conveyor 92 is displayed, which is used for displaying an object being conveyed sequentially, in the upper right of the screen. The object is to be subsequently dropped. An object-information column 97 for displaying the information of the object 93 to be subsequently dropped is provided in the lower right of the screen. A shelter 94 is provided in the upper left of the screen. The shelter 94 is used to temporarily shelter an object, which is to be dropped next, instead of letting the object fall. A temperature column 95 indicating the internal temperature of the game field 91 and an oxygen column 96 indicating the amount of oxygen are provided in the lower left of the screen. A character 98 having a function of removing an object, which exists in the bottom of the game field 91, to the outside of the game field 91 is displayed in the bottom of the screen.

The object database 60 stores the data of an object arranged in the game field. FIG. 3 shows an example of internal data in the object database 60. In the object database 60, an object-ID column 70, a position column 71, a direction column 72, a shape column 73, and a status column 74 are provided. The object-ID column 70 stores the ID of an object accumulated in the game field 91. The position column 71 stores a three-dimensional coordinate that indicates the position of the center of gravity of an object. The direction column 72 stores a three-dimensional vector that indicates the direction of an object in a state of being accumulated. The shape column 73 stores data that indicates the shape of an object. As described previously, in the game according to the present embodiment, the shape of an object is altered by a collision with another object. However, the alteration achieved by a physical calculation after precisely modeling the shape of the object requires heavy computational load. Thus, several sets of data on the shape of the object are prepared depending on the degree of the alteration in advance, and the shape of the object is altered in stages by an alteration. The status column 74 stores data that indicates the condition of an object. Status of the object includes, for example, "normal," "burning," "decomposing," and "falling." In addition, the object database 60 stores, for example, data on a shape and a physical quantity of each object, data on a force acting on the object, and data on the physical quantity of the object and an amount of adjusting the force.

Figure 4:
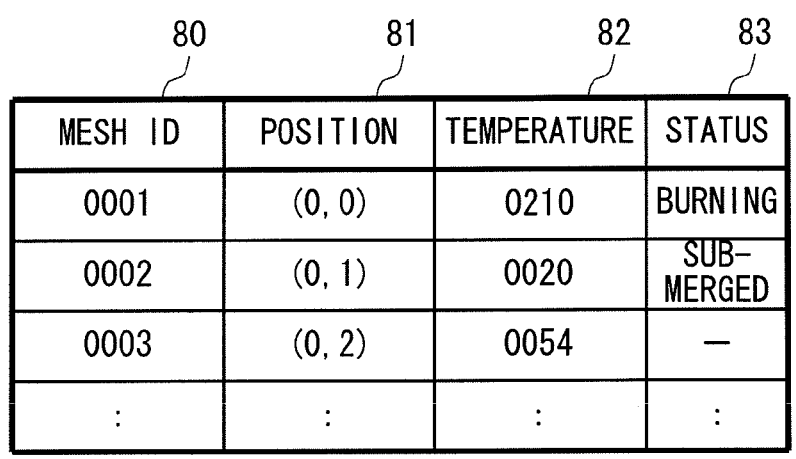
FIG. 4 is a diagram showing an example of internal data in a distribution-data storage unit.

The distribution-data storage unit 62 stores data for simulating the distribution of the physical quantity in the game field. FIG. 4 shows an example of internal data in the distribution-data storage unit 62. In the distribution-data storage unit 62, a mesh ID column 80, a position column 81, a temperature column 82, and a status column 83 are provided. The mesh ID column 80 stores the ID of a mesh used when a two-dimensional game field, which is obtained by projecting the three-dimensional game field 91 onto a two-dimensional plane, is divided in a mesh-like manner. A two-dimensional plane, which is parallel to a side surface and onto which the game field 91 is projected, to be displayed on the display screen shown in FIG. 2 is specified to be a two-dimensional game field. In other words, the game field that appears on the display screen is the two-dimensional game field. The position column 81 stores a two-dimensional coordinate that indicates the position of the mesh. As described previously, in the present embodiment, when simulating the temperature distribution, the distribution in the depth direction in the three-dimensional game field 91 is disregarded, and a coordinate in the depth direction is thus omitted. Therefore, objects that overlaps with one another in the depth direction are assumed to be located at the same position. The temperature column 82 stores the temperature of the mesh. The temperature of the mesh is simulated and updated by a temperature-distribution simulator 44 as described hereinafter. The status column 83 stores data that indicates the condition of the mesh. Status of the object includes, for example, "burning," "submerged," and "mycelial growth."

A game control unit 41 runs a game program and controls the progress of a game. Details of specific operations will be described later.

A physical-calculation engine 42 calculates the motion (e.g., a displacement, a rotation, and a collision) of an object based on an equation of motion. For an object such as, for example, an object being hung from the belt conveyor 92, an object falling in the game field 91, and an object being accumulated in the game field 91, the physical-calculation engine 42 calculates the behavior of the object by retrieving the physical quantity of the object such as a weight and a friction coefficient and then by applying, for example, a gravity or drag generated by air.

A physical-quantity adjustment unit 43 adjusts a physical quantity of an object and a force acting on the object in reference to the object database 60 so as to achieve a desired motion, when the object needs to be moved without following the laws of physics. More specifically, when the game control unit 41 drops the object from above the game field 91, the physical-quantity adjustment unit 43 applies, on the object, a virtual force that acts upwardly in the vertical direction so that the falling velocity is reduced to be a predetermined velocity and so that the object falls at a constant velocity. It can be considered that the buoyancy or drag, which is larger than the normal size thereof, is being applied on the object, or it can be considered that the gravity is reduced to be smaller than the normal size thereof. The physical-quantity adjustment unit 43 changes the weight of the object to be a predetermined value so as to adjust the drag generated by air at this time. The physical-quantity adjustment unit 43 may change the volume of the object to be a predetermined value so as to adjust the buoyancy of the object.

In a conventional game, a still image of an object is used by downwardly moving the image to express the object falling in the game field 91 when the object falls. According to the present embodiment, the behavior of an object is also calculated by a physical calculation during a time when the object is falling. Therefore, the present embodiment allows, for example, the object to sway sideways when the object is moved from side to side and the object to collide with another object so as to move or deform said another object. This allows for the reproduction of the behavior of the object with an improved sense of reality and thus allows for the improvement of the entertainment value of the game.

The temperature-distribution simulator 44 simulates the temperature distribution in the game field 91. In a game according to the present embodiment, an ignition item is prepared for burning an object accumulated in the game field 91, and the ignition item, when arranged in the game field 91, burns the object if the surrounding object satisfies a predetermined condition for burning. The temperature-distribution simulator 44 simulates a change, which is caused due to the burning of the ignition item or the object, in the temperature distribution in the game field 91.

The temperature-distribution simulator 44 acquires a three-dimensional position of a heat source such as the ignition item or the burning object in reference to the object database 60 and identifies a mesh that corresponds to the position. The temperature-distribution simulator 44 sets the temperature of the mesh with the heat source to a predetermined temperature.

The temperature-distribution simulator 44 calculates the temperature of each mesh and updates the data in the distribution-data storage unit 62 at a predetermined time, for example, at a time when the screen generator 66 generates a screen. The temperature-distribution simulator 44 may set a propagation velocity of a temperature of an object, air, etc., and calculate the temperature distribution by a physical calculation. Alternatively, the temperature-distribution simulator 44 may simply calculate statistics of the temperatures of surrounding meshes so as to set the temperature of the mesh at a subsequent predetermined time to be the calculated temperature.

The temperature-distribution simulator 44 determines whether or not each object arranged in the game field 91 is to be burned after calculating the temperature of the object. The temperature-distribution simulator 44 acquires a three-dimensional position of an object from the object database 60 and identifies a mesh that corresponds to the position. The temperature-distribution simulator 44 acquires an ignition temperature of the object from the object database 60 and checks whether or not the temperature of a corresponding mesh is above the ignition temperature. When the temperature of the mesh is above the ignition temperature and when the amount of oxygen in the game field 91 is at least a predetermined value, the temperature-distribution simulator 44 determines that the object has started burning and updates the status of the object database 60 and the distribution-data storage unit 62. The temperature-distribution simulator 44 may assume, when a part of the object has started burning, that the other part of the object has also started burning or may determine for each mesh whether or not the object burns.

Since the game field 91 is a three-dimensional space, there is also a temperature distribution in the depth direction. Strictly speaking, the propagation of the temperature in the depth direction must be also taken into consideration. However, since the game screen mainly displays the game field viewed from the side, the heat distribution in the depth direction is not so important. In the game field 91, an object can be accumulated on another object, which is already accumulated, or can fall in front of or in the back of another object. Thus, a plurality of objects can be accumulated such that the objects overlap with one another in the depth direction. However, only the object in the front is displayed on the screen. Therefore, the distribution of a temperature in the depth direction will cause unnecessary complexity and will be confusing to the player. Therefore, the temperature-distribution simulator 44 simulates a temperature distribution on a two-dimensional plane on the assumption that the temperature is the same in the depth direction. This not only reduces the computational load but also allows the physical phenomenon to be expressed to the player in an easily understood manner.

A mycelial-growth simulator 45 simulates a mycelial growth in the game field 91. In the present embodiment, it is set that special mycelia, which decompose an object, grow in the game field 91 and that the object that has been in contact with the mycelia for a predetermined period of time is decomposed and eventually deleted from the game field 91. The game control unit 41 drops, at a predetermined frequency, into the game field 91 a spore of mycelia for decomposing an object accumulated in the game field 91 and water in a container such as a bucket as items. When the spore item is arranged in the game field 91 and when the spore is submerged in water, mycelia grow from the spore, and the object is decomposed by the mycelia.

The mycelial-growth simulator 45 calculates the growth of the mycelia for each mesh at a predetermined time, for example, at a time when the screen generator 66 generates a screen. The mycelial-growth simulator 45 may calculate the growth of the mycelia based on parameters such as the temperature, the amount of oxygen, and the speed of the growth of the mycelia in the game field 91. Alternatively, the mycelial-growth simulator 45 may, for example, simply allow the mycelia to grow in a random direction by one mesh for every predetermined-number of frames if the spore is submerged in water.

Just like the temperature-distribution simulator 44, the mycelial-growth simulator 45 also disregards the growth of the mycelia in the depth direction and simulates the growth of the mycelia on a two-dimensional plane. This allows the computational load to be reduced while minimizing any effect on the game.

Figure 5:
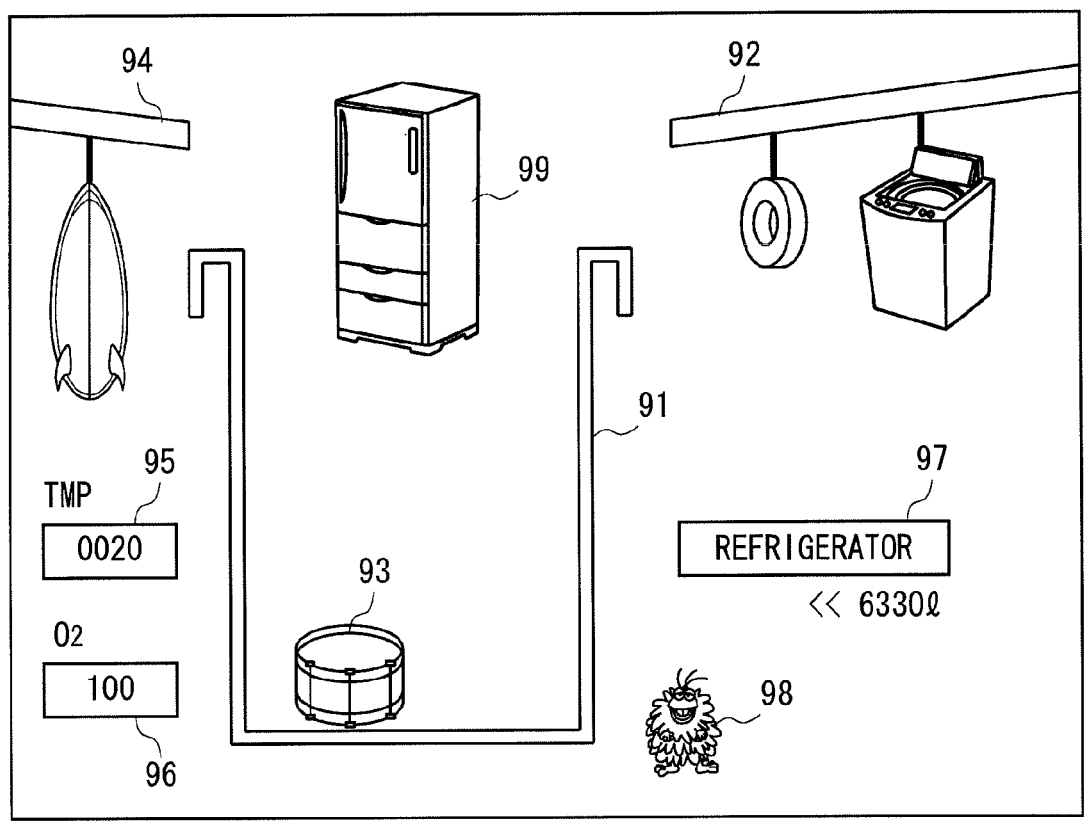
FIG. 5 is a diagram showing an example of a screen displayed in a display device.

The operation of the game is now described in reference to figures. FIG. 5 shows an example of a screen displayed on a display device. The game control unit 41 displays an object to be dropped in the game field 91 being selected, among objects for which data on the shapes is prepared in advance, at a predetermined interval of time and the selected object being sequentially hung from the belt conveyor 92 and transported into the game field 91 by the belt conveyor 92. An object 99, which is the next object to be dropped into the game field 91, is arranged in a position in the upper center of the game field 91 and is stopped temporarily. When the object 99 is ready to be dropped, the game control unit 41 calculates the fall of the object 99 by the physical-calculation engine 42 after the physical quantity is adjusted by the physical-quantity adjustment unit 43 so that the screen generator 66 generates a screen.

Upon the receipt of an instruction from the player during the fall of the object 99, the game control unit 41 moves the object 99 from side to side or rotates the object 99. The movement of the object 99 at this time is also calculated by the physical-calculation engine 42. If the objects 99 does not move for at least a predetermined period of time after coming into contact with another object or the wall or the bottom surface of the game field 91, the game control unit 41 fixes the object at the position and registers the information in the object database 60.

Figure 6:
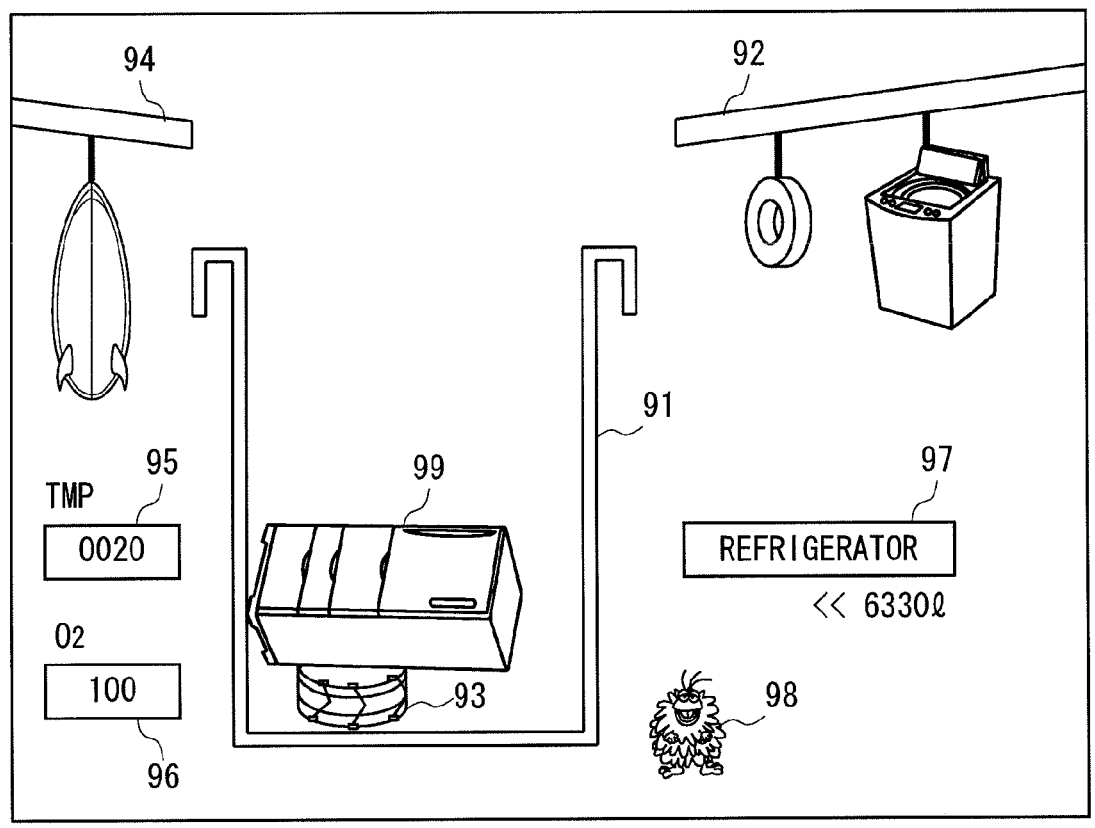
FIG. 6 is a diagram showing an example of a screen displayed in a display device.

FIG. 6 shows an example of a screen displayed on a display device. The player can deform an object 93 by moving the heavy object 99 to collide with the object 93, which can be easily deformed. The game control unit 41 calculates an energy of the collision of the object 99 with the object 93 and determines the degree of the deformation of the object according to the energy. In accordance with the determined degree of the deformation, the game control unit 41 retrieves new data on the shape from the object database 60 and updates the image of the object. The game control unit 41 also updates the corresponding shape column 73 and position column 71 of the object.

Figure 7:
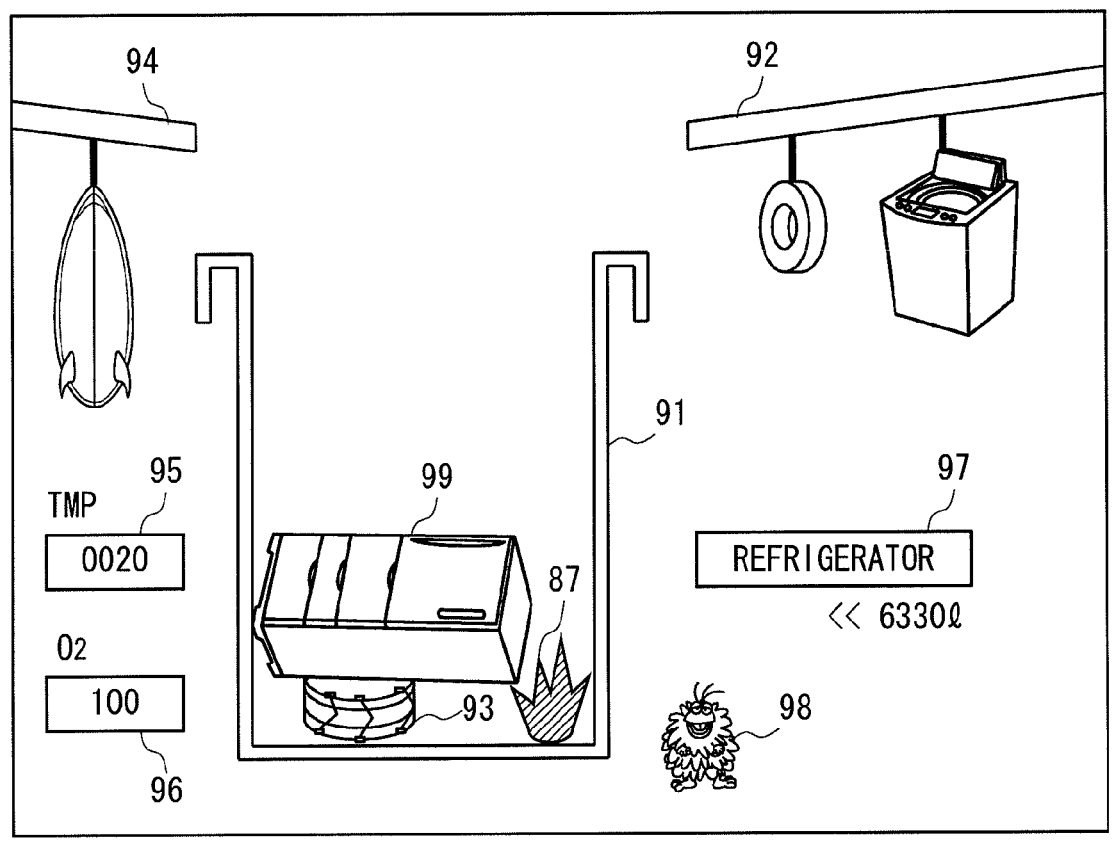
FIG. 7 is a diagram showing an example of a screen displayed in a display device.
Figure 8:
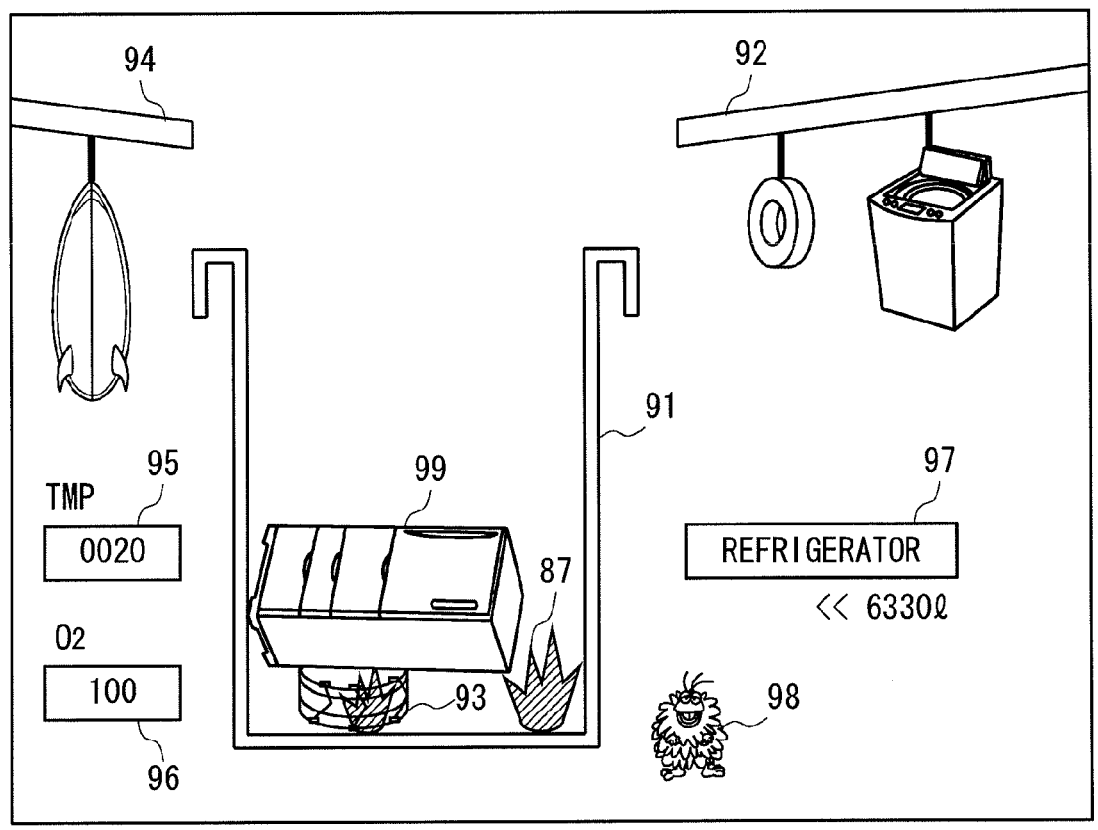
FIG. 8 is a diagram showing an example of a screen displayed in a display device.

FIG. 7 shows an example of a screen displayed on a display device. When an ignition item 87 is arranged in the game field 91, the temperature-distribution simulator 44 starts simulating the temperature distribution in the game field 91. An ignition temperature is set for each object. When the temperature of the mesh in which an object is arranged exceeds the ignition temperature, the game control unit 41 burns the object 93 as shown in FIG. 8 and updates the object database 60 and the status column of the distribution-data storage unit 62. When applying the temperature stored in the distribution-data storage unit 62 to an object, the game control unit 41 assumes that all the objects arranged in the vertical direction of the display screen have the same temperature. When an object is burning in the game field 91, the game control unit 41 reduces the amount of oxygen in the game field 91 at a predetermined speed. When the amount of oxygen in the game field 91 goes below a predetermined value, the game control unit 41 stops burning the object.

Figure 9:
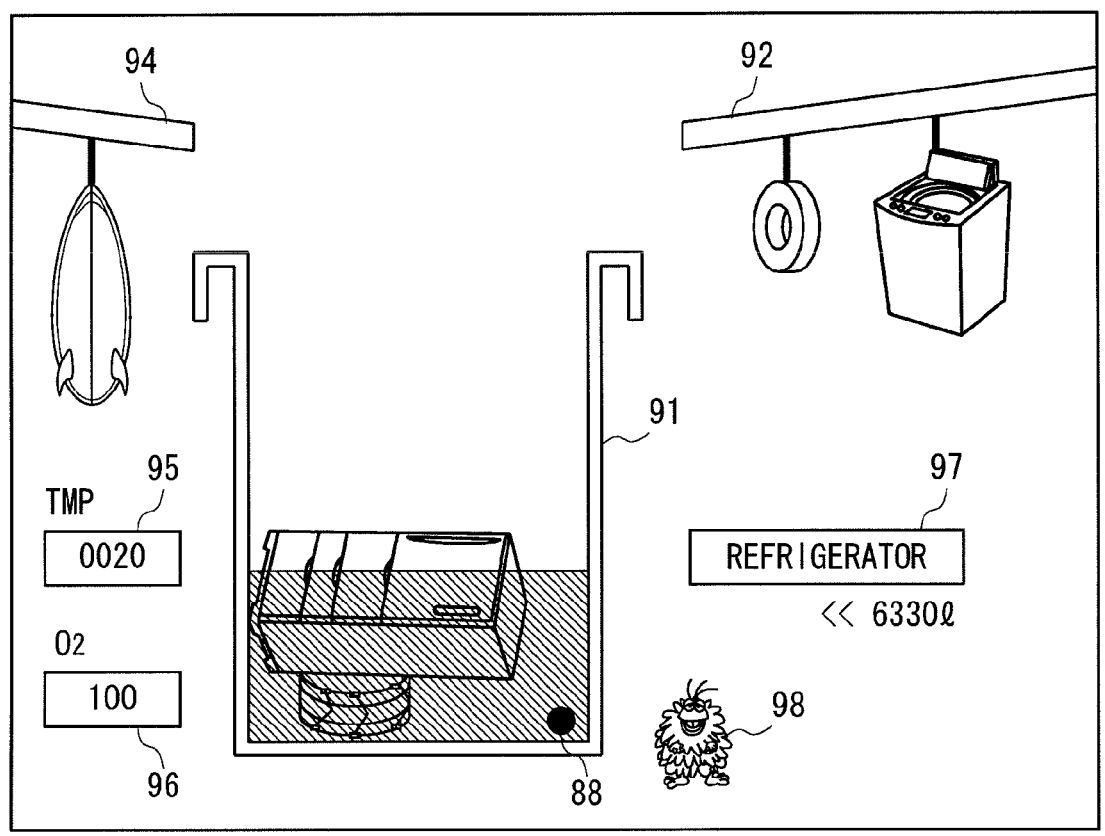
FIG. 9 is a diagram showing an example of a screen displayed in a display device.
Figure 10:
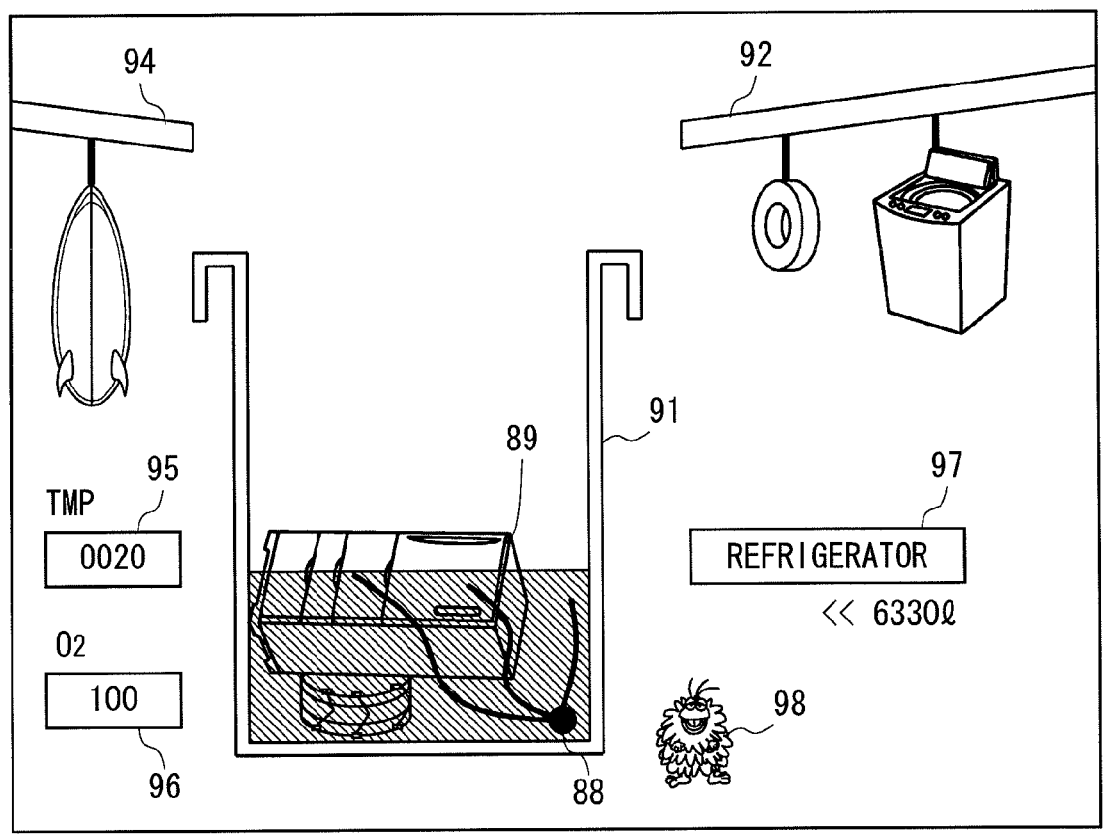
FIG. 10 is a diagram showing an example of a screen displayed in a display device.

FIG. 9 shows an example of a screen displayed on a display device. When a spore item 88 is arranged in the game field 91 with some water inside thereof, the mycelial-growth simulator 45 starts simulating the growth of mycelia. A condition of decomposition by mycelia is set for each object. As shown in FIG. 10, mycelia 89 grows in a mesh in which an object is arranged, and when a predetermined condition is satisfied, the game control unit 41 decomposes the object and deletes the object from the game field 91.

The game control unit 41 drops, in the game field 91, an important item that should not be deformed or deleted at a predetermined frequency. If the item remain undeformed in the bottom of the game field 91 for at least a predetermined period of time, the game control unit 41 displays the character 98 taking the item away from the game field 91 and deletes the item from the object database 60. If the item disappears due to the burning or the decomposition, the game control unit 41 concurrently drops a plurality of objects into the game field 91 as a penalty.

Described above is an explanation based on the exemplary embodiments of the present invention. The embodiment is intended to be illustrative only and it will be obvious to those skilled in the art that various modifications to constituting elements and processes could be developed and that such modifications are also within the scope of the present invention.

EXPLANATION OF REFERENCE NUMERALS

10 game device
20 controller
30 input reception unit
40 control unit
41 game control unit
42 physical-calculation engine
43 physical-quantity adjustment unit
44 temperature-distribution simulator
45 mycelial-growth simulator
60 object database
62 distribution-data storage unit

INDUSTRIAL APPLICABILITY

The present invention can be applied to a game device that controls a game where objects are moved in a game field.

The invention claimed is:

1. A non-transitory computer-readable medium with a game control program embedded thereon to be implemented by a computer system, the game control program comprising:
   an arrangement module configured to arrange an object in a three-dimensional space provided in a game field and store data indicating a position of the arranged object in an object database;
   a simulator module configured to simulate a physical phenomenon on the three-dimensional space by simulating a physical phenomenon on a two-dimensional plane onto which the three-dimensional space is projected, disregarding a direction of one of dimensions of the three-dimensional space, and by reflecting a result of simulation in the disregarded direction; and
   a control module configured to apply the simulated physical phenomenon on the object in the three-dimensional space, wherein
   the simulator module configured to simulate a physical phenomenon retrieves, from a storage unit that stores a value of physical characteristic in each of a plurality of meshes, each mesh obtained by dividing the two-dimensional plane into a plurality of computational meshes, a value of physical characteristic in a mesh and a value of physical characteristic in a surrounding mesh thereof, to calculate the value of physical characteristic in the mesh based on the value of physical characteristic in the surrounding mesh, and to store the calculated value of physical characteristic in the storage unit;
   the arrangement module arranges a spore of mycelia for decomposing the object and an ignition item for burning the object in the three-dimensional space, and stores data indicating a position of the spore and the ignition item in the object database;
   the simulator module includes a mycelia growth simulator configured to refer to the object database, allow the mycelia to grow from the spore in accordance with a predetermined condition for growth, and store distribution of the mycelia in the storage, and also includes a temperature distribution simulator configured to refer to the object database, cause the ignition item to ignite the object in accordance with a predetermined condition for burning, and store distribution of temperature in the three-dimensional space in the storage;
   when the arrangement module arranges the spore in the three-dimensional space, the control module causes the mycelia growth simulator to simulate growth of the mycelia, deletes data for the object that has been in contact with the mycelia for a predetermined period of time from the object database, determining that the object is decomposed; and
   when the arrangement module arranges the ignition item in the three-dimensional space, the control unit causes the temperature distribution simulator to simulate distribution of the temperature and deletes data for the object that has reached a predetermined temperature, the predetermined temperature being associated with the object, from the object database, determining that the object is burned.

2. The medium according to claim 1, further comprising:
   a module configured to generate a screen that displays the three-dimensional space, wherein
   the module, which is configured to simulate a physical phenomenon, simulates a physical phenomenon on a two-dimensional plane obtained by projecting the three-dimensional space on a plane parallel to the screen.

3. A game device having a processor, a display and a storage unit, the game device comprising:
- an arrangement unit configured to arrange an object in a three-dimensional space provided in a game field shown on the display and store data indicating a position of the arranged object in an object database;
- a simulator configured to simulate a physical phenomenon on the three-dimensional space by simulating a physical phenomenon on a two-dimensional plane onto which the three-dimensional space is projected, disregarding a direction of one of dimensions of the three-dimensional space, and by reflecting a result of simulation in the disregarded direction; and
- a control unit configured to apply the simulated physical phenomenon on the object in the three-dimensional space, wherein
- the simulator retrieves, from the storage unit that stores a value of physical characteristic in each of a plurality of meshes, each mesh obtained by dividing the two-dimensional plane into a plurality of computational meshes, a value of physical characteristic in a mesh and a value of physical characteristic in a surrounding mesh thereof, calculates the value of physical characteristic in the mesh based on the value of physical characteristic in the surrounding mesh, and stores the calculated value of physical characteristic in the storage unit;
- the arrangement unit arranges a spore of mycelia for decomposing the object and an ignition item for burning the object in the three-dimensional space, and stores data indicating a position of the spore and the ignition item in the object database;
- the simulator includes a mycelia growth simulator configured to refer to the object database, allow the mycelia to grow from the spore in accordance with a predetermined condition for growth, and store distribution of the mycelia in the storage, and also includes a temperature distribution simulator configured to refer to the object database, cause the ignition item to ignite the object in accordance with a predetermined condition for burning, and store distribution of temperature in the three-dimensional space in the storage;
- wherein when the arrangement module arranges the spore in the three-dimensional space, the control module causes the mycelia growth simulator to simulate growth of the mycelia, deletes data for the object that has been in contact with the mycelia for a predetermined period of time from the object database, determining that the object is decomposed; and
- when the arrangement module arranges the ignition item in the three-dimensional space, the control unit causes the temperature distribution simulator to simulate distribution of the temperature and deletes data for an object that has reached a predetermined temperature, the predetermined temperature being associated with the object, from the object database, determining that the object is burned.

4. A game control method executed on a game device having a processor comprising:
- arranging, using the processor, an object in a three-dimensional space provided in a game field on a display of the game device and storing data indicating a position of the arranged object in an object database;
- simulating a physical phenomenon on the three-dimensional space by simulating a physical phenomenon on a two-dimensional plane onto which the three-dimensional space is projected on the display, disregarding a direction of one of dimensions of the three-dimensional space, and by reflecting a result of simulation in the disregarded direction; and
- applying and displaying the simulated physical phenomenon on the object in the three-dimensional space, wherein
- the simulating includes:
- retrieving, from a storage unit of the game device, wherein the storage unit stores a value of physical characteristic in each of a plurality of meshes, each mesh obtained by dividing the two-dimensional plane into a plurality of computational meshes, a value of physical characteristic in a mesh and a value of physical characteristic in a surrounding mesh thereof;
- calculating the value of physical characteristic in the mesh based on the value of physical characteristic in the surrounding mesh; and
- storing the calculated value of physical characteristic in the storage unit;
- the arranging further includes:
- arranging a spore of mycelia for decomposing the object and an ignition item for burning the object in the three-dimensional space, and storing data indicating a position of the spore and the ignition item in the object database;
- the simulating further includes:
  - a mycelia growth simulator configured to refer to the object database, allow the mycelia to grow from the spore in accordance with a predetermined condition for growth, and store distribution of the mycelia in the storage; and
  - a temperature distribution simulator configured to refer to the object database, cause the ignition item to ignite the object in accordance with a predetermined condition for burning, and store distribution of temperature in the three-dimensional space in the storage;
- when the spore is arranged in the three-dimensional space, causing the mycelia growth simulator to simulate growth of the mycelia, deleting data for the object that has been in contact with the mycelia for a predetermined period of time from the object database, determining that the object is decomposed; and
- when the ignition item is arranged in the three-dimensional space, causing the temperature distribution simulator to simulate distribution of the temperature and deleting data for the object that has reached a predetermined temperature, the predetermined temperature being associated with the object, from the object database, determining that the object is burned.

* * * * *